Patented Nov. 12, 1935

2,020,533

UNITED STATES PATENT OFFICE 2,020,533

PROCESS FOR TREATING NUTS

Joseph A. Zaloom, New York, N. Y.

No Drawing. Application May 29, 1933,
Serial No. 673,473

6 Claims. (Cl. 99—11)

My present invention is disclosed in its most specific embodiment for the treatment of nuts, more especially nuts in the shell and in the most specific embodiment relates to the treatment of pistachio nuts in the shell.

Among the objects of the invention are to provide a process which can be readily and practically carried out with the use of simple and known equipment, and without the need for highly specialized expert care or supervision, to improve both the appearance and the inherent value of the food product, as an article of consumption and to preserve it against spoilage or decay.

More specifically, it is an object to provide a method for applying to the nut a shell-like opaque water soluble coating, which under normal conditions would become brittle, and protecting said coating from breakage under mechanical impulse, from the access of moisture thereto which might tend to impair the appearance and integrity of said shell-like coating, and which will at the same time, effect a substantially hermetic seal to exclude the atmospheric oxygen, that tends to impart rancidity, also to prevent evaporation of volatile flavoring constituents of the kernel and effectively to exclude atmospheric moisture from the kernel, which would tend to make the latter soggy.

A specific object is to improve the familiar white coated pistachio nuts, which are a common article of commerce in the United States, in order more effectively to prevent the white coating shell of the kernel from chipping, breaking or disintegrating, to prevent adhesion of nuts to each other, more effectively to preserve the flavor of the nut and to prevent the shaking off of salt either in dry or moist condition, which particularly impairs sales appeal of the nuts, and is further damaging by causing corrosion or jamming of the mechanism of the vending machines, in which such nuts are frequently dispensed, and further to protect the consumer against the possibly unpleasant and undesirable effect of high concentrations of salt from the shell on the lips and into the mouth.

The present application is a continuation in part of my copending application, Serial No. 655,262, filed February 4, 1933 and to issue May 30, 1933 under Patent No. 1,911,869.

Pistachio nuts, to which this invention has its most specific and preferred application are imported into the United States in the form of slightly cleft hard shells enclosing the edible kernel. These nuts have an unattractive dirty looking external appearance, and have but little flavor prior to roasting or seasoning with salt or the like.

It is, accordingly, common practice to treat these nuts by roasting, while tumbling these nuts in a machine of the type of a conventional coffee roaster, and in the course of roasting or heating, applying to the nuts preferably by introducing into the roaster in the form of a spray, salt, and a protective colloid in an aqueous carrier, preferably in aqueous solution. The protective colloid ordinarily employed is starch or a gum, such as gum arabic, or substances with equivalent action for the intended purpose. Preferably, the roasting proceeds to a limited extent before the solution is added and the heating is continued substantially until the excess water has been driven off and the kernels of the individual nuts have been flavored by salt and upon the shell of the nut there has been built an opaque white uniform coating.

An alternative to the step just described, consists in applying a salt solution substantially devoid of any protective colloid, such solution being applied concurrently with the application of the roasting heat, the gum naturally present on the shell of the nut serving in that case as the protective colloid, to effect the adhesive bond of the opaque coating to the shell of the nut. The nuts thus treated either by the preferred or by the alternative process above described, present an attractive pure white appearance, the coating of the nut being of semi-colloidal character. The physico-chemical constitution of the coating, as thus far prepared, is unstable, for the salt in the semi-colloidal condition, tends to crystallize and render the coat hard and brittle, physically somewhat of the character of an egg shell.

According to the process, the nuts, substantially immediately after cooling and before the salt has had an opportunity to crystallize to large extent, are subjected to another treatment to produce thereon, an outer protective coating of glazed transparent water insoluble material. The material for this coating in a non-aqueous volatile carrier is preferably applied in a spray, while the nuts freshly treated by the process above set forth, are tumbled preferably in an imperforate drum, without the application of external heat. Since the previously applied coating is in a semi-colloidal state, as above noted, it will not chip or break, appreciably under mechanical impulse in the course of tumbling, and as the tumbling proceeds, such coating is mechanically protected by the outer tough transparent coating produced thereon. In this process, also the adhesive outer protective coating bonds itself effectively to, and serves to bind more firmly on the nut the original opaque foundation coating.

The outer coating is preferably of edible shellac free from arsenic and rosin. It is dissolved preferably in ethyl alcohol, which readily evaporates during the tumbling operation previously described, but if desired, air may be blown through the tumbling machine during the treatment with the shellac.

After the latter treatment has been completed, the nuts are removed from the tumbling machine and the final drying and hardening of the coating is permitted to proceed in open air without further mechanical agitation.

The product produced by the method above set forth is a nut in the shell, of a pure white appearance with a highly polished glazed finish. The shell is absolutely dry and smooth to the touch and is tough and non-brittle. The shellac coating, moreover, seals the cleft of the shell and thereby effectively protects the enclosed kernel from loss of volatile oils by evaporation, from rancidity due to the entry of atmospheric oxygen thereto, and from sogginess by excluding atmospheric moisture therefrom.

Nuts of the character described even though shipped by truck over rough roads for long distance, will not lose their salt. In consumption of the nuts, the salt is not spread on the clothing or floors, and the mouth and lips of the consumer are protected from excessive quantities of salt that might be introduced were the outer shellac coating omitted. The nuts have a particular advantage in preserving their integrity even under conditions of excessive atmospheric humidity. For instance, such nuts exposed to the atmosphere at sea beaches, remain dry and do not "sweat" or adhere together. Furthermore, these nuts lend themselves particularly for dispensing in vending machines, since the free salt and moisture do not come into contact with the mechanism and clogging or corrosion thereof are obviated.

While the invention as above noted, has special utility in its application to pistachio nuts, it will be understood that in its broader aspects, the invention is applicable to the treatment of other nuts, whether cleft or not, such, as for instance, walnuts, brazil nuts, almonds, filberts, peanuts and the like. Furthermore, the invention in its broadest aspect is not limited to nuts but may be applied to seeds, such as squash seeds, pumpkin seeds and sunflower seeds and is also applicable in other relations.

It will thus be seen that there is herein described a process in which the several features of this invention are embodied, and which attains the various objects of the invention and is well suited to meet the requirements of practical use.

As many changes could be made in the above process, and many apparently widely different embodiments of this invention could be made without departing from the scope thereof, it is intended that all matter contained in the above description shall be interpreted as illustrative and not in a limiting sense.

I claim:—

1. The method of treating a food product, which consists in applying thereto a solution having a colloidal ingredient and a crystalline ingredient and before the crystalline ingredient of the resultant coating has had an opportunity materially to crystallize, applying thereto an outer protective coating affording a smooth polished exterior and substantially insoluble in water.

2. The method of treating a food product, which consists in applying thereto a solution having a colloidal ingredient and a crystalline ingredient and before the crystalline ingredient of the coating thus formed has had an opportunity materially to crystallize, applying to the product an outer protective coating of edible shellac.

3. The method of treating a nut comprising a kernel enclosed in a hard cleft shell, which comprises treating the nut with a combined coating and flavoring substance in an aqueous carrier including a protective colloid, applying heat to remove excess water resulting in a coated shell with a flavored kernel, and then before the flavoring substance has had an opportunity to crystallize materially, treating the nuts with edible shellac in a non-aqueous carrier and causing the carrier to evaporate.

4. The method of treating nuts of the type including a kernel slightly exposed through a cleft shell, which method consists in spraying onto the nut an aqueous solution of salt with a protective colloid, while tumbling the nuts, and applying heat to evaporate excess water, and before the salt ingredient of the resultant coating has developed substantial crystalline structure, tumbling the nuts in relatively cool condition while spraying thereonto edible shellac in a non-aqueous volatile carrier.

5. The method of treating pistachio nuts, each comprising a kernel in a cleft hard shell, the shell having natural gum thereon, which method consists in applying to the nut an aqueous solution of salt, while simultaneously applying roasting heat to cause the natural gum, acting as a protective colloid, to develop its adhesiveness for bonding the salt to the shell and before the salt ingredient of the coating thus formed has crystallized materially, tumbling said nuts in the presence of an edible shellac in a nonaqueous volatile carrier.

6. The method of treating pistachio nuts, the kernel of each of which is enclosed in a cleft hard shell, which method consists in tumbling said nuts under roasting heat while applying thereto a spray comprising salt and a protective colloid in an aqueous carrier, thereby evaporating free water during the roasting operation, to season the kernel with salt and to build upon the exterior of the shell, a shell-like coating, and before the salt ingredient of the coating has had an opportunity to develop a substantially crystalline structure, tumbling the nuts in the presence of edible shellac in a non-aqueous volatile carrier to build thereon, an outer protective water insoluble elastic coating.

JOSEPH A. ZALOOM.